Nov. 4, 1958         H. ELOFSON         2,858,867
STALK AND STRAW DISINTEGRATING AND SCATTERING MECHANISM
Filed July 14, 1954                    2 Sheets-Sheet 1

INVENTOR
HARRY ELOFSON
BY Williamson, Williamson
Schroeder & Adams
ATTORNEYS

Nov. 4, 1958          H. ELOFSON          2,858,867

STALK AND STRAW DISINTEGRATING AND SCATTERING MECHANISM

Filed July 14, 1954          2 Sheets-Sheet 2

INVENTOR
HARRY ELOFSON
ATTORNEYS

United States Patent Office 2,858,867
Patented Nov. 4, 1958

2,858,867

STALK AND STRAW DISINTEGRATING AND SCATTERING MECHANISM

Harry Elofson, Grand Forks, N. Dak.

Application July 14, 1954, Serial No. 443,220

5 Claims. (Cl. 146—164)

This invention relates to harvesting machines such as combines, from which straw, stalks and the like are discharged and more specifically relates to mechanism for disintegrating and scattering straw being discharged from such machines.

The subject matter of this invention relates to improvements of my original invention as shown in U. S. Letters Patent Nos. 2,554,669 and 2,670,775.

Although the structures constituting my previous inventions have operated satisfactorily, improvements thereon can be made to increase the efficiency of operation of such mechanisms and to somewhat simplify the construction thereof. For instance, in the previous inventions the straw fell downwardly by gravity from the straw conveyor of the combine and then was guided into the scattering mechanism when the straw had lost substantially all of its momentum imparted thereto by the straw conveyor of the combine. Of course, it would require less power to drive the straw through the disintegrating mechanism if the momentum developed by the outwardly traveling straw mass in the straw conveyor could be utilized to at least start the straw through the disintegrating mechanism.

In addition, each of the heretofore disclosed structures discharges and scatters the straw in a substantially horizontal direction from the rear end of the combine. By so scattering the disintegrated straw, a large amount of dust was created by the scattering straw.

Also, the structures heretofore disclosed provided solely for the disintegration and scattering of straw discharged from the conveyor. If it were desirable to utilize the straw for some other purpose than to be spread over the field, the straw could not be collected, and therefore with such previously known mechanism, baling of the straw was not possible.

A general object of my invention is to provide in the straw delivery portion of a harvesting machine, such as a combine, improved stalk and straw disintegrating and scattering mechanism of relatively simple and inexpensive operation.

Another object of my invention is to provide in a crop harvesting machine, a novel stalk and straw disintegrating and scattering mechanism which utilizes the momentum of the straw mass imparted thereto by the straw conveyor of the machine for moving the straw into and through the disintegrating and scattering mechanism for reducing the power consumption of such mechanism.

Still another object of my invention is to provide an improved stalk and straw disintegrating and scattering mechanism for use with crop harvesting machines which receives the moving straw mass from the straw discharging conveyor of the machine and ejects the same after comminution thereof without abruptly or substantially changing the direction of flow of the moving mass.

A further object of my invention is the provision of a new stalk and straw disintegrating and scattering mechanism for use with crop harvesting machinery such as a combine, wherein the disintegrating elements break the straw and stalks into fine particles and cooperate with the hood of the combine to direct the same toward the ground to minimize the amount of dust created.

A still further object of my invention is to provide an improved straw delivery portion of a crop harvesting machine, such as a combine, which is interchangeably adapted to either drop the straw to the ground for baling or to disintegrate and scatter the straw behind the harvesting machine.

These and other objects and advantages of my invention will more fully appear from the following description made in connection with the accompanying drawings wherein like reference characters refer to the same parts throughout the several views and in which.

Figure 1:
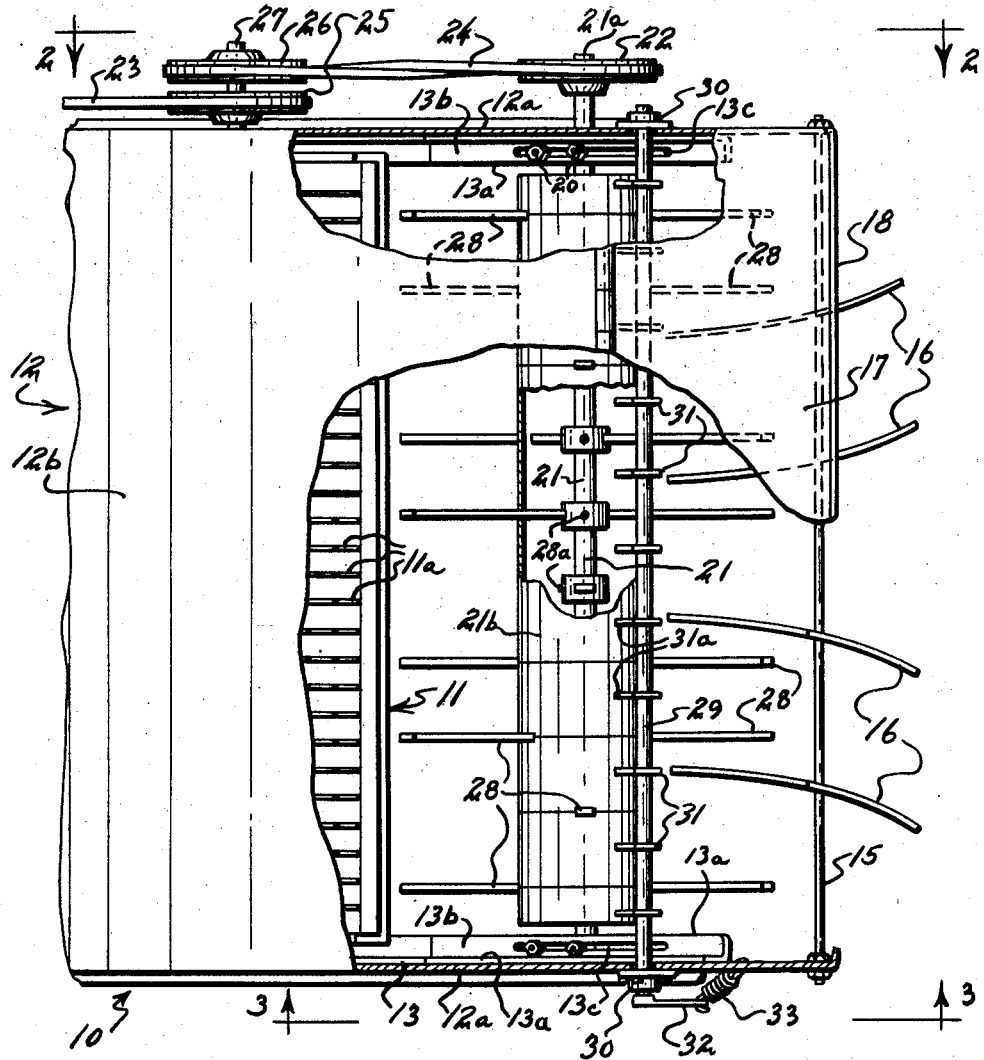
Fig. 1 shows a plan view of the rear end portion of a harvesting machine being partially cut away to disclose my invention.

The straw delivery portion of a harvesting machine 10 is shown in the accompanying drawings and may include a conventional type straw conveyor 11, a hood 12 and supporting structure 13. Of course there will be a grain conveyor 14 positioned below the straw conveyor in a harvesting machine such as a combine. The straw conveyor 11 in the form shown has a rearwardly extending discharge end 11a over which the straw travels in a rearward and outward direction. Hood 12 includes upstanding side walls 12a positioned laterally of and on opposite sides of straw conveyor 11. In the form shown hood 12 also includes an inclined top 12b which is positioned above discharge conveyor 11 and is connected to side walls 12a. Top 12b of hood 12 slopes downwardly in an outward and rearward direction with respect to conveyor 11. Hood 12, which extends outwardly and rearwardly from the discharge end 11a of straw conveyor 11 defines a straw discharge passage through which the straw travels after being discharged from conveyor 11. In the form shown hood 12 has an open rear end and may have an open bottom. The side walls 12a of hood 12 may be secured together by tie bars 15.

A plurality of upstanding and outwardly extending scattering fins 16 are mounted in the open rear end portion of hood 12 and are secured to tie bars 15 as by welding. Each of the scattering fins 16 is laterally curved to deflect straw and straw particles passing therebetween in a direction laterally of the combine 10.

Cover plate 17 is provided above the open rear end portion of hood 12 and is hingedly connected to the top 12b thereof. When closed, cover plate 17 constitutes an extension of top 12b of hood 12. Cover plate 17 may be secured in closed position by any suitable means such as hooks 18.

The rear end portion 13a of frame 13 extends outwardly of the discharge end 11a of conveyor 11 and is inclined upwardly. In the form shown, frame 13 is constructed of angle iron and has a substantially horizontal portion 13b with an elongated slot 13c formed therein and in the rear end portion 13a thereof.

Bearings 19 are secured to frame members 13 by means of bolts and nuts 20 which extend through the elongated grooves 13c of frame members 13. The position of bearings 19 is adjustable throughout the length of groove 13c.

The straw scattering and disintegrating mechanism which includes my invention is mounted in the straw delivery portion of the harvesting machine adjacent to and outwardly of the discharge end 11a of straw conveyor 11. Said mechanism includes, in the form shown, a shaft 21 journalled in bearings 19 below the discharge end 11a of conveyor 11 and extending in transverse relation thereto throughout the entire width of the conveyor 11 and hood 12. One end portion 21a of shaft 21 extends through the respective side wall 12a of hood 12 and has a driving pulley 22 secured thereto. Power is transmitted to pulley 22 and shaft 21 from the power source in the combine through belts 23 and 24 and pulleys 25 and 26 which turn with stud or shaft 27.

A plurality of outstanding and radially extending crusher arms 28 are secured to shaft 21 for rotation therewith as by set screws 28a and are positioned at regular intervals along the entire length of said shaft. Crusher arms 28 extend radially from shaft 21 a sufficient distance to swing into close proximity with the discharge end 11a of straw conveyor 11 and with cover plate 17 in closed position which forms an extension of top 12b of hood 12.

A cylindrical drum 21b is concentrically mounted on and affixed to shaft 21 to rotate therewith. Each of the crusher arms 28 extends through apertures in drum 21b.

Figure 2:
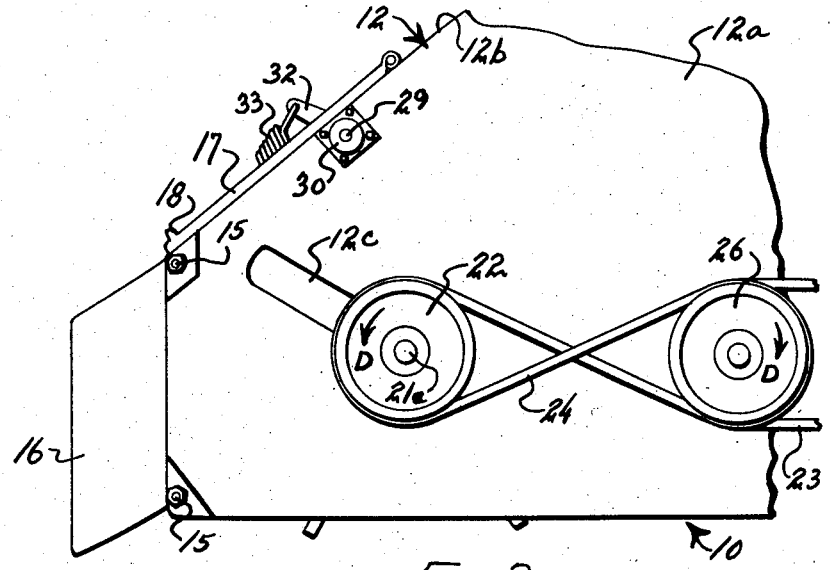
Fig. 2 is a side elevation view taken substantially at 2—2 of Fig. 1.
Figure 3:
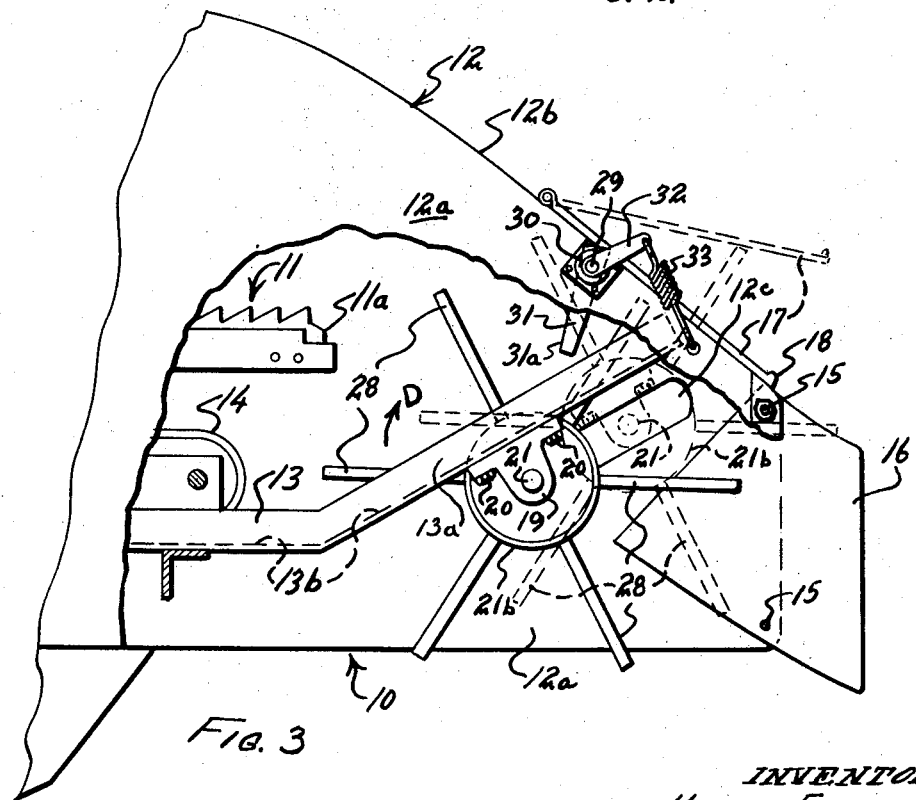
Fig. 3 is a side elevation view partly broken away of the rear end portion of a harvesting machine and taken at substantially 3—3 of Fig. 1.

As best shown in Fig. 2 an elongated groove 12c is provided in the side wall 12a of hood 12 through which the outer end portion 21a of shaft 21 extends. Groove 12c is inclined upwardly and outwardly at substantially the same slope as the slope of the rear end portions 13a of frame members 13. When bearings 19 are shifted rearwardly, shaft 21 will shift in slot 12c of hood 12 and cover plate 17 will be opened to permit outward shifting of shaft 21 and crusher arms 28 a sufficient distance to permit straw being discharged from conveyor 11 to fall downwardly through the open bottom of hood 12 to the ground without engaging crusher arms 28.

A second rotatable shaft 29 is journalled in bearings 30 which are secured to side walls 12a of hood 12 adjacent to the upper portion or cover plate 17 thereof. A plurality of knives 31, which may have sharpened forward edges 31a, are fixedly secured to shaft 29 to turn therewith. Knives 31 extend downwardly from shaft 29 into the straw discharge passage defined by hood 12 and into proximity with and between crusher arms 28.

An outstanding arm 32 is fixedly secured exteriorly of hood 12 to one of the end portions of shaft 29 for rotation therewith. A tension spring 33 is secured to the respective side wall 12a of hood 12 and to the outer end portion of arm 32 for restricting rotation of shaft 29 and knives 31.

In operation straw conveyor 11 carries straw in a rearward and outward direction, discharging the same over the discharge end 11a thereof with substantial momentum to carry the straw into engagement with crusher arms 28. Shaft 21 and crusher arms 28 are powered to rotate in the range of 2500 to 3000 R. P. M. and in the direction indicated by arrow D. Each of the crusher arms 28 in its over-passing arc of rotation swings upwardly into the straw discharge passage defined by hood 12 and swings into proximity with and outwardly from the discharge end 11a of conveyor 11 substantially in the direction of the traveling straw being discharged from conveyor 11. Each of the crusher arms 28 engages straw being discharged from conveyor 11 and propels the same in substantial continuity of direction of travel toward the open rear end portion of hood 12. The inclined top 12b and cover plate 17 of hood 12 deflect the outwardly traveling straw and cause the same to be discharged through the open rear end portion of hood 12 in a downward direction.

As crusher arms 28 carry the straw in an outward direction through the discharge passage defined by hood 12, knives 31 engage the straw to cut and disintegrate the same into small particles and fragments. Because knives 31 extend downwardly through the straw discharge passage and because crusher arms 28 swing upwardly through the straw discharge passage and into proximity with cover plate 17, substantially all of the straw discharged from conveyor 11 will be engaged by crusher arms 28 and knives 31 to accomplish substantially complete disintegration of all of the straw discharged by conveyor 11.

When clumps of wet straw or other similar material, which are not easily disintegrated, are carried by crusher arms 28 into engagement with knives 31, knives 31 will swing in an outward direction to allow the clumps of wet straw to be discharged from the disintegrating and scattering mechanism without disintegrating such clumps. Knives 31 are permitted to turn by stretching of spring 33 which operates to return knives 31 to their normal operating position when such clumps of wet straw have passed outwardly.

After the straw has been disintegrated, the straw fragments and particles travel outwardly through the open rear end portion of hood 12 and are scattered in diverse lateral directions by fins 16.

When it is desired to save the straw for baling, the bearings 19 may be shifted rearwardly of the rear end portion 13a of frame members 13 to position crusher arms 28 in spaced apart relation with the discharge end 11a of straw conveyor 11. Cover plate 17 will be opened to allow several of the crusher arms to extend outwardly through the upper portion of hood 12. Belt 24 may be removed to allow the crusher arms 28 to remain stationary. When the crusher arms 28 and shaft 21 are in rearwardly shifted position, the straw being discharged from conveyor 11 is free to fall to the ground through the open bottom of hood 12.

It will be seen that I have provided in the straw delivery portion of a harvesting machine, an improved stalk and straw disintegrating and scattering mechanism of relatively inexpensive and simple construction and operation which utilizes the existing momentum of the outwardly traveling straw mass to minimize the power consumption of the mechanism.

It should also be apparent that I have provided in the straw delivery portion of a harvesting machine such as a combine, a novel stalk and straw disintegrating and scattering mechanism which engages and propels the straw mass being discharged by the straw conveyor of the combine through said mechanism without abruptly changing the direction of travel thereof and causes the disintegrated straw to be directed toward the ground to minimize the dust created and to minimize the power consumption of the mechanism.

In addition it will be noted that I have provided in the straw delivery portion of a harvesting machine such as a combine, an improved stalk and straw disintegrating and scattering mechanism which is shiftable out of operating position to permit the straw to be dropped to the ground for bailing.

It will, of course, be understood that various changes may be made in the form, detail, arrangement and proportion of the parts without departing from the scope of my invention which consists of the matter described herein and set forth in the appended claims.

What I claim is:

1. A combine including a straw delivery portion, a straw discharge conveyor carrying straw in an outward direction and having a discharge end; a hood having side walls adjacent to the opposite sides of the conveyor and having a top positioned above the discharge end of the conveyor, said hood defining a discharge passage; a stalk and straw disintegrating mechanism mounted outwardly of and adjacent to the discharge end of said conveyor and comprising a shaft journaled for rotation below the discharge end of said conveyor and extending in transverse relation thereto, a plurality of crusher arms each secured in outstanding relation to said shaft for rotation therewith, the outer ends of said arms being disposed for swinging into close proximity with the discharge end of the conveyor and with the top of said hood, means driving said shaft to swing said arms in their over-passing arcs of rotation through said discharge passage substantially in the outward direction of travel of the straw discharging from said conveyor and engaging and propelling in substantial continuity of direction of travel the straw discharged by the conveyor, a plurality of knives adjacent the top of the hood and between the arms, and said knives extending downwardly from the hood toward said shaft, and into proximity with the crusher arms to coact therewith in disintegrating the straw propelled thereby, and means mounting said knives on the hood such that the cutting edges of said knives are at substantially the same horizontal level as said discharge end of the conveyor.

2. Apparatus as defined in claim 1 including a second rotatable shaft mounted in the straw discharge portion of the harvesting machine, said knives being secured to said second shaft, and yieldable means resiliently restricting rotation of said second shaft to maintain said knives in cooperative relation with said crusher arms.

3. For use in conjunction with a harvesting machine having a conveyor for carrying straw in overlying relation thereto and in an outward direction, a stalk and straw scattering and disintegrating mechanism having in combination a rotatable shaft mounted outwardly of and below the discharge end of such a conveyor and extending in transverse relation thereto, a plurality of crusher arms secured in outstanding relation to said shaft for rotation therewith, means driving said shaft at high speeds to swing said arms in their over-passing arcs of rotation swinging outwardly from the discharge end of such a conveyor substantially in the direction of the straw being discharged therefrom and each propelling in substantial continuity of direction the outwardly traveling straw therefrom, said shaft being adjustably shiftable outwardly of the discharge end of such a conveyor to position said crusher arms in outwardly spaced relation with the conveyor to provide an unobstructed opening between the conveyor and arms and thereby permit the straw to fall to the ground without being engaged by said arms, and a plurality of knives mounted above said shaft and extending between and into proximity with said crusher arms to coact therewith in disintegrating the straw carried thereby.

4. The straw discharging mechanism of a harvesting machine, said mechanism comprising a straw conveyor discharging straw in an outward direction and having a discharge end, a hood having side walls and having a top positioned above the discharge end of said straw conveyor, said hood extending outwardly from the discharge end of said conveyor and defining a straw discharge passage, a stalk and straw scattering and disintegrating mechanism mounted adjacent to and outwardly of the discharge end of said conveyor and comprising a rotatable shaft journalled below the discharge end of said conveyor and extending in transverse relation thereto, a plurality of crusher arms fixedly secured to said shaft in radially outstanding relation for rotation therewith, means for driving said shaft at high speeds to swing said arms in their over-passing arcs of rotation into proximity with and outwardly from the discharge end of said conveyor substantially in the direction of the travel of the straw discharged by said conveyor and into close proximity with the top of the hood, and each of said arms engaging and rapidly propelling in substantial continuity of direction the straw discharged by said conveyor, said shaft being adjustably shiftable in an outward direction from said conveyor to position said crusher arms in spaced relation with the discharge end of said conveyor and permitting straw discharged thereby to fall to the ground, and a second pivot shaft journalled for rotative oscillation adjacent to the top of said hood and having a plurality of knives secured thereto to oscillate therewith, said knives extending into said discharge passage and between said crusher arms to coact therewith in disintegrating the straw propelled thereby.

5. The structure recited in claim 4 and said hood having an open bottom adjacent to the discharge end of said conveyor, and said top being openable adjacent to said first mentioned shaft to facilitate projection of said radially extending crusher arms outwardly of said hood when said shaft is adjustably shifted outwardly to permit straw from said conveyor to by-pass the crusher arms and drop through the open bottom of said hood to be deposited on the ground.

References Cited in the file of this patent

UNITED STATES PATENTS

| 825,426   | Smith    | July 10, 1906  |
| 1,012,795 | Barth    | Dec. 26, 1911  |
| 1,221,863 | Hunt     | Apr. 10, 1917  |
| 1,259,089 | Felcyn   | Mar. 12, 1918  |
| 2,239,486 | Edwards  | Apr. 22, 1941  |
| 2,281,846 | Klein    | May 5, 1942    |
| 2,502,032 | Watson   | Mar. 28, 1950  |
| 2,515,165 | Siems    | July 11, 1950  |
| 2,558,530 | Wimperis | June 26, 1951  |
| 2,670,775 | Elofson  | Mar. 2, 1954   |
| 2,700,996 | Smith    | Feb. 1, 1955   |